United States Patent
Murthy et al.

(10) Patent No.: US 9,055,095 B2
(45) Date of Patent: Jun. 9, 2015

(54) DOS DETECTION AND MITIGATION IN A LOAD BALANCER

(71) Applicant: Microsoft Corporation, Redmond, WA (US)

(72) Inventors: Ashwin Murthy, Bellevue, WA (US); Naveen Reddy Karri, Redmond, WA (US); Parveen Kumar Patel, Sunnyvale, CA (US); HongYu Wu, Redmond, WA (US); Marios Zikos, Alexandroupolis (GR); Yagya Narayanan Sethuraman, Redmond, WA (US); Deepak Bansal, Sammamish, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 97 days.

(21) Appl. No.: 13/918,669

(22) Filed: Jun. 14, 2013

(65) Prior Publication Data

US 2014/0373146 A1  Dec. 18, 2014

(51) Int. Cl.
*G06F 12/14* (2006.01)
*H04L 29/06* (2006.01)

(52) U.S. Cl.
CPC .................................. *H04L 63/1408* (2013.01)

(58) Field of Classification Search
USPC ...................................... 726/22–25; 713/188
See application file for complete search history.

(56) References Cited

U.S. PATENT DOCUMENTS

| | | | |
|---|---|---|---|
| 8,856,924 B2 * | 10/2014 | Holloway et al. | 726/22 |
| 2008/0034424 A1 * | 2/2008 | Overcash et al. | 726/22 |
| 2010/0138919 A1 * | 6/2010 | Peng et al. | 726/22 |
| 2011/0083179 A1 | 4/2011 | Lawson et al. | |
| 2013/0254375 A1 * | 9/2013 | Agiwal et al. | 709/224 |
| 2013/0283373 A1 * | 10/2013 | Zisapel et al. | 726/22 |
| 2013/0291107 A1 * | 10/2013 | Marck et al. | 726/23 |

OTHER PUBLICATIONS

"Imperva Cloud DDoS Protection Service", Retrieved on: Apr. 10, 2013, Available at: http://www.imperva.com/docs/DS_Imperva_Cloud_DDoS_Protection_Service.pdf.
Turk, D., "Configuring BGP to Block Denial-of-Service Attacks", In Network Working Group, Request for Comments: 3882, Mar. 2004, 7 pages.
Lonea, et al., "Detecting DDoS Attacks in Cloud Computing Environment", In International Journal of Computers, Communications & Control, vol. 8, Issue 1, Feb. 2013, 9 pages.

(Continued)

*Primary Examiner* — Amare F Tabor
(74) *Attorney, Agent, or Firm* — Ben Tabor; David Andrews; Micky Minhas

(57) ABSTRACT

A load balancer that is able to detect and mitigate a Denial of Service (DOS) attack. The load balancer is placed in the flow path of network data packets that are destined for one or more tenant addresses. The load balancer analyzes performance parameters regarding the network data packets that are destined for the one or more tenant addresses and are received at the load balancer. The performance parameters describe network data packet flow to the tenant addresses. The load balancer detects, based on the analysis of the performance parameters, that one or more of the tenant addresses are being subjected to a DOS attack. The load balancer performs a mitigation operation to isolate the one or more tenant addresses being subjected to the DOS attack.

18 Claims, 10 Drawing Sheets

(56) References Cited

OTHER PUBLICATIONS

Chonka, et al., "Detecting and Mitigating HX-DoS Attacks against Cloud Web Services", In 15th International Conference on Network-Based Information Systems, Sep. 26, 2012, 6 pages.

Beloglazov, et al., "Managing Overloaded Hosts for Dynamic Consolidation of Virtual Machines in Cloud Data Centers Under Quality of Service Constraints", In IEEE Transactions on Parallel and Distributed Systems, Aug. 15, 2012, 14 pages.

Li, et al., "On Sliding Window Based Change Point Detection for Hybrid SIP DoS attack", In IEEE Asia-Pacific Services Computing Conference, Dec. 6, 2010, 8 pages.

Haris, et al., "Detecting TCP SYN Flood Attack based on Anomaly Detection", In Second International Conference on Network Applications, Protocols and Services, Sep. 22, 2010, 5 pages.

"Defending Against Denial of Service Attacks", Published on: Oct. 31, 2012, Available at: http://security.radware.com/uploadedFiles/Resources_and_Content/Attack_Tools/Securosis%20Defending-Against-DoS_FINAL-Radware%20pdf.pdf.

* cited by examiner

DOS DETECTION AND MITIGATION IN A LOAD BALANCER

BACKGROUND

A load balancer allows multiple machines to be associated with a single virtual network address in a virtual, distributed environment. A load balancer may also be used in a native environment. Network messages that are addressed to the virtual network address are received by the load balancer, which decides which of multiple machines are to handle the network message. The load balancer then forwards the network message towards the selected machine.

A Denial of Service (DOS) attack, also referred to a Distributed Denial of Service (DDOS) attack, is typically caused by forcing one or more sources to issue numerous requests thereby overloading network resources and making network resources unavailable to intended users. A DOS attack aimed at a load balancer can disrupt the operation of the load balancer and thus cause limited availability to the services of the virtual, distributed environment.

The subject matter claimed herein is not limited to embodiments that solve any disadvantages or that operate only in environments such as those described above. Rather, this background is only provided to illustrate one exemplary technology area where some embodiments described herein may be practiced.

BRIEF SUMMARY

Embodiments described herein are related to a load balancer that is able to detect and mitigate a Denial of Service (DOS) attack. The load balancer is placed directly in the flow path of network data packets that are structured so as to be directed to one or more of the tenant addresses. The load balancer analyzes performance parameters regarding the network data packets that are directed to the one or more tenant addresses and are received at the load balancer. The performance parameters describe network data packet flow to the tenant addresses.

The load balancer detects, based on the analysis of the performance parameters, that one or more tenant addresses are being subjected to a DOS attack. The load balancer performs a mitigation operation to isolate the one or more tenant addresses being subjected to the DOS attack.

This Summary is not intended to identify key features or essential features of the claimed subject matter, nor is it intended to be used as an aid in determining the scope of the claimed subject matter.

BRIEF DESCRIPTION OF THE DRAWINGS

In order to describe the manner in which the above-recited and other advantages and features can be obtained, a more particular description of various embodiments will be rendered by reference to the appended drawings. Understanding that these drawings depict only sample embodiments and are not therefore to be considered to be limiting of the scope of the invention, the embodiments will be described and explained with additional specificity and detail through the use of the accompanying drawings in which.

DETAILED DESCRIPTION

Figure 1:
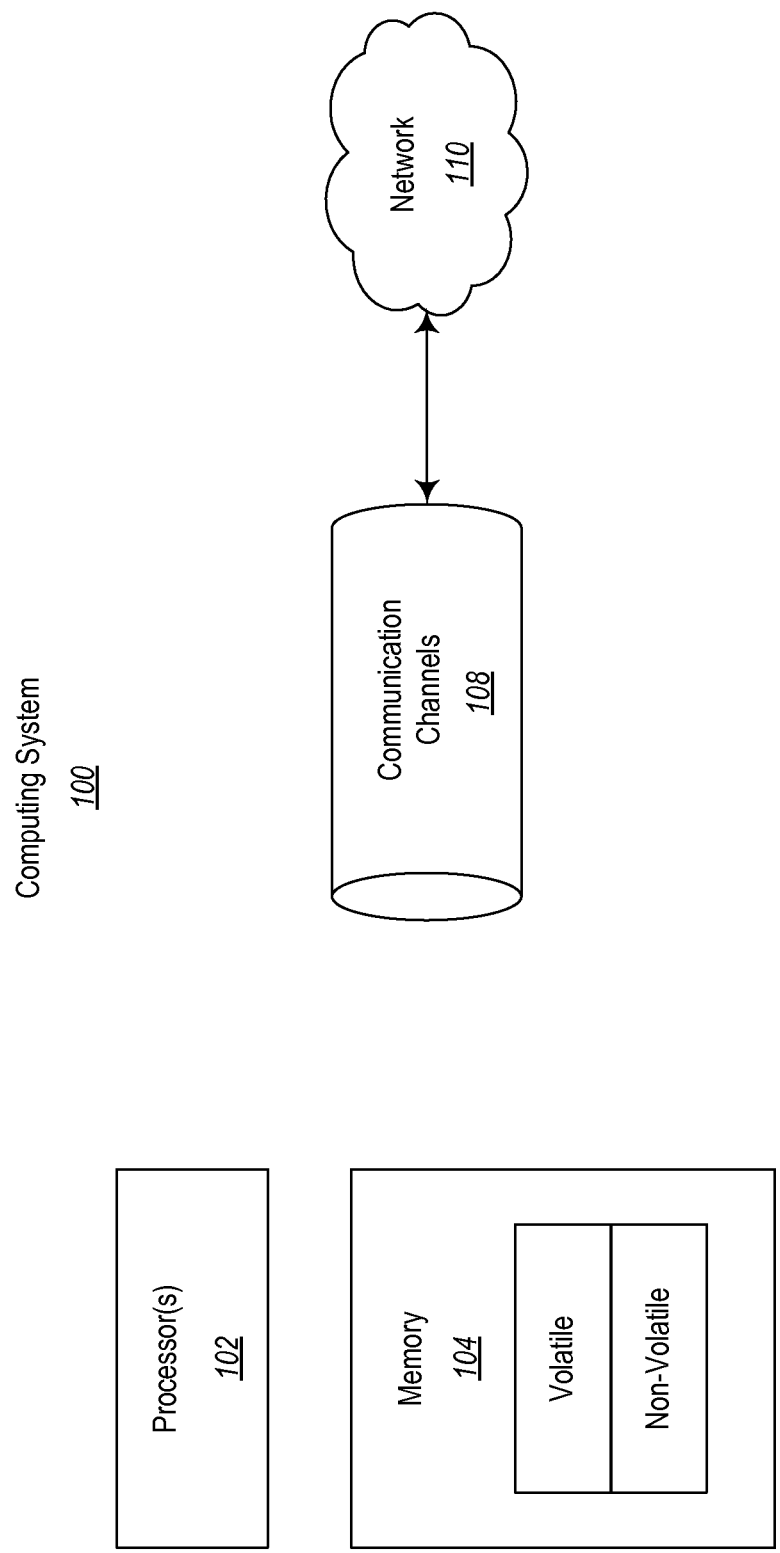
FIG. 1 illustrates a computing system in which some embodiments described herein may be employed.

Some introductory discussion about a Denial of Service (DOS) attack will first be given. A DOS attack, also referred to a Distributed Denial of Service (DDOS) attack, is typically caused by forcing one or more sources to issue numerous requests thereby overloading network resources and making network resources unavailable to intended users. Two typical DOS attacks are a SYN flood attack and a User Datagram Protocol (UDP) flood attack.

In a SYN flood attack, the attacker overwhelms a victim with a large number of TCP SYN packets and does not complete TCP 3-way handshakes. This causes victim's resource exhaustion for new connections and prevents the victim from handling new legitimate connection requests. The source IP address is usually spoofed making it much more difficult for the victim to distinguish between legitimate and illegitimate client.

In a UDP attack, the attacker overwhelms the victim with a large number of UDP packets destined to the victim. Since there is no flow control for UDP this prevents the victim from handling legitimate packets from other sources.

Conventional DOS detection and mitigation systems typically are located near an edge router and sample a portion of the incoming network data packets. However, such random sampling may not detect a distributed attack that is intended for multiple addresses. In addition, sampling at the edge router is unable to detect DOS attacks that are initiated by a first tenant against a second tenant inside a cloud computing system and the edge router will not see the network data packets used in the DOS attack. Further, conventional DOS detection and mitigation systems typically require a higher bandwidth than a typical load balancer has.

In accordance with embodiments described herein, a load balancer that is able to detect and mitigate a DOS attack will be described. The load balancer is placed in the flow path of network data packets that are destined for one or more tenant addresses. The load balancer analyzes performance parameters regarding the network data packets that are destined for the one or more tenant addresses and are received at the load balancer. The performance parameters describe network data packet flow to the tenant addresses.

The load balancer detects, based on the analysis of the performance parameters, that one or more tenant addresses are being subjected to a DOS attack. In some embodiments the load balancer collects the performance parameters and then compares them with performance thresholds. If enough of the performance parameters exceed the performance thresholds, the load balancer determines that DOS attack is occurring. The load balancer then identifies which of the tenant addresses is being subjected to the DOS attack.

The load balancer performs a mitigation operation to isolate the one or more tenant addresses being subjected to the DOS attack. In some embodiments, a "blacklisting" operation may be performed that stops network data packets from being sent to the one or more tenant addresses being subjected to the attack. In other embodiments, a dedicated data plane component of the load balancer may be used to handle the network data packets of the one or more tenant addresses being subjected to the DOS attack.

Some introductory discussion of a computing system will be described with respect to FIG. 1. Then, the principles of operation of virtual machines will be described with respect to FIG. 2. Subsequently, the principles of a load balancer to detect and mitigate a DOS attack will be described with respect to FIG. 3 and successive figures.

Computing systems are now increasingly taking a wide variety of forms. Computing systems may, for example, be handheld devices, appliances, laptop computers, desktop computers, mainframes, distributed computing systems, or even devices that have not conventionally been considered a computing system. In this description and in the claims, the term "computing system" is defined broadly as including any device or system (or combination thereof) that includes at least one physical and tangible processor, and a physical and tangible memory capable of having thereon computer-executable instructions that may be executed by the processor. The memory may take any form and may depend on the nature and form of the computing system. A computing system may be distributed over a network environment and may include multiple constituent computing systems.

As illustrated in FIG. 1, in its most basic configuration, a computing system 100 typically includes at least one processing unit 102 and memory 104. The memory 104 may be physical system memory, which may be volatile, non-volatile, or some combination of the two. The term "memory" may also be used herein to refer to non-volatile mass storage such as physical storage media. If the computing system is distributed, the processing, memory and/or storage capability may be distributed as well. As used herein, the term "module" or "component" can refer to software objects or routines that execute on the computing system. The different components, modules, engines, and services described herein may be implemented as objects or processes that execute on the computing system (e.g., as separate threads).

In the description that follows, embodiments are described with reference to acts that are performed by one or more computing systems. If such acts are implemented in software, one or more processors of the associated computing system that performs the act direct the operation of the computing system in response to having executed computer-executable instructions. For example, such computer-executable instructions may be embodied on one or more computer-readable media that form a computer program product. An example of such an operation involves the manipulation of data. The computer-executable instructions (and the manipulated data) may be stored in the memory 104 of the computing system 100. Computing system 100 may also contain communication channels 108 that allow the computing system 100 to communicate with other message processors over, for example, network 110.

Embodiments described herein may comprise or utilize a special purpose or general-purpose computer including computer hardware, such as, for example, one or more processors and system memory, as discussed in greater detail below. Embodiments described herein also include physical and other computer-readable media for carrying or storing computer-executable instructions and/or data structures. Such computer-readable media can be any available media that can be accessed by a general purpose or special purpose computer system. Computer-readable media that store computer-executable instructions are physical storage media. Computer-readable media that carry computer-executable instructions are transmission media. Thus, by way of example, and not limitation, embodiments of the invention can comprise at least two distinctly different kinds of computer-readable media: computer storage media and transmission media.

Computer storage media includes RAM, ROM, EEPROM, CD-ROM or other optical disk storage, magnetic disk storage or other magnetic storage devices, or any other physical, tangible medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry or desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to computer storage media (or vice versa). For example, computer-executable instructions or data structures received over a network or data link can be buffered in RAM within a network interface module (e.g., a "NIC"), and then eventually transferred to computer system RAM and/or to less volatile computer storage media at a computer system. Thus, it should be understood that computer storage media can be included in computer system components that also (or even primarily) utilize transmission media.

Computer-executable instructions comprise, for example, instructions and data which, when executed at a processor, cause a general purpose computer, special purpose computer, or special purpose processing device to perform a certain function or group of functions. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, and the like. The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Figure 2:
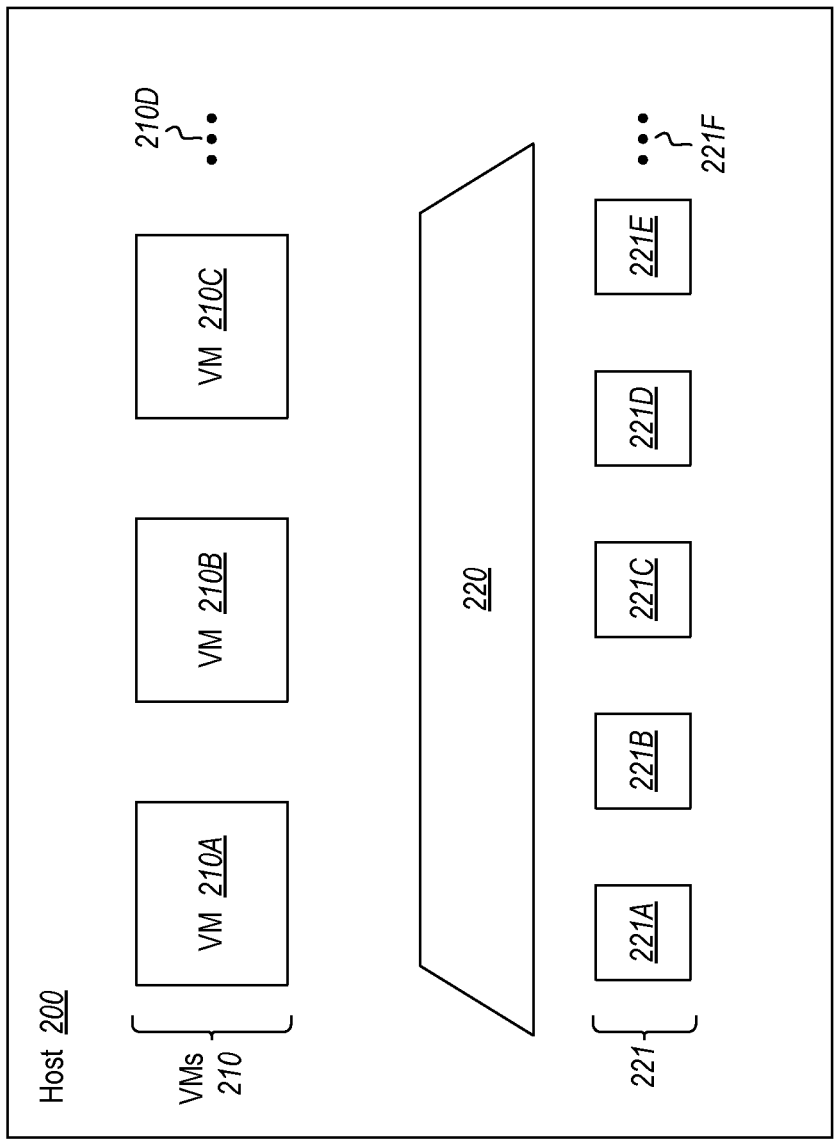
FIG. 2 illustrates a host computing system that hosts multiple virtual machines and provides access to physical resources through a hypervisor.

Having described a physical computing system (or physical machine) with respect to FIG. 1, the concept of a virtual computing system (or virtual machine) will now be described. One type of physical computing system is termed a host computing system (or simply "host"). Each host is capable of running one or more, and potentially many, virtual machines. For instance, FIG. 2 abstractly illustrates a host 200 in further detail. In the case of FIG. 2, the host 200 is illustrated as operating three virtual machines 210 including virtual machines 210A, 210B and 210C. However, the ellipses 210D once again represents that the principles described herein are not limited to the number of virtual machines running on the host 200. There may be as few as zero virtual machines running on the host with the only upper limit being defined by the physical capabilities of the host 200.

During operation, the virtual machines emulates a fully operational computing system including an at least an operating system, and perhaps one or more other applications as well. Each virtual machine is assigned to a particular client, and is responsible to support the desktop environment for that client.

The virtual machine generates a desktop image or other rendering instructions that represent a current state of the desktop, and then transmits the image or instructions to the client for rendering of the desktop. As the user interacts with the desktop at the client, the user inputs are transmitted from the client to the virtual machine. The virtual machine processes the user inputs and, if appropriate, changes the desktop state. If such change in desktop state is to cause a change in the rendered desktop, then the virtual machine alters the image or rendering instructions, if appropriate, and transmits the altered image or rendered instructions to the client computing system for appropriate rendering. From the prospective of the user, it is as though the client computing system is itself performing the desktop processing.

The host 200 includes a hypervisor 220 that emulates virtual resources for the virtual machines 210 using physical resources 221 that are abstracted from view of the virtual machines 210. The hypervisor 221 also provides proper isolation between the virtual machines 210. Thus, from the perspective of any given virtual machine, the hypervisor 220 provides the illusion that the virtual machine is interfacing with a physical resource, even though the virtual machine only interfaces with the appearance (e.g., a virtual resource) of a physical resource, and not with a physical resource directly. In FIG. 2, the physical resources 221 are abstractly represented as including resources 221A through 221F. Examples of physical resources 221 including processing capacity, memory, disk space, network bandwidth, media drives, and so forth.

Figure 3:
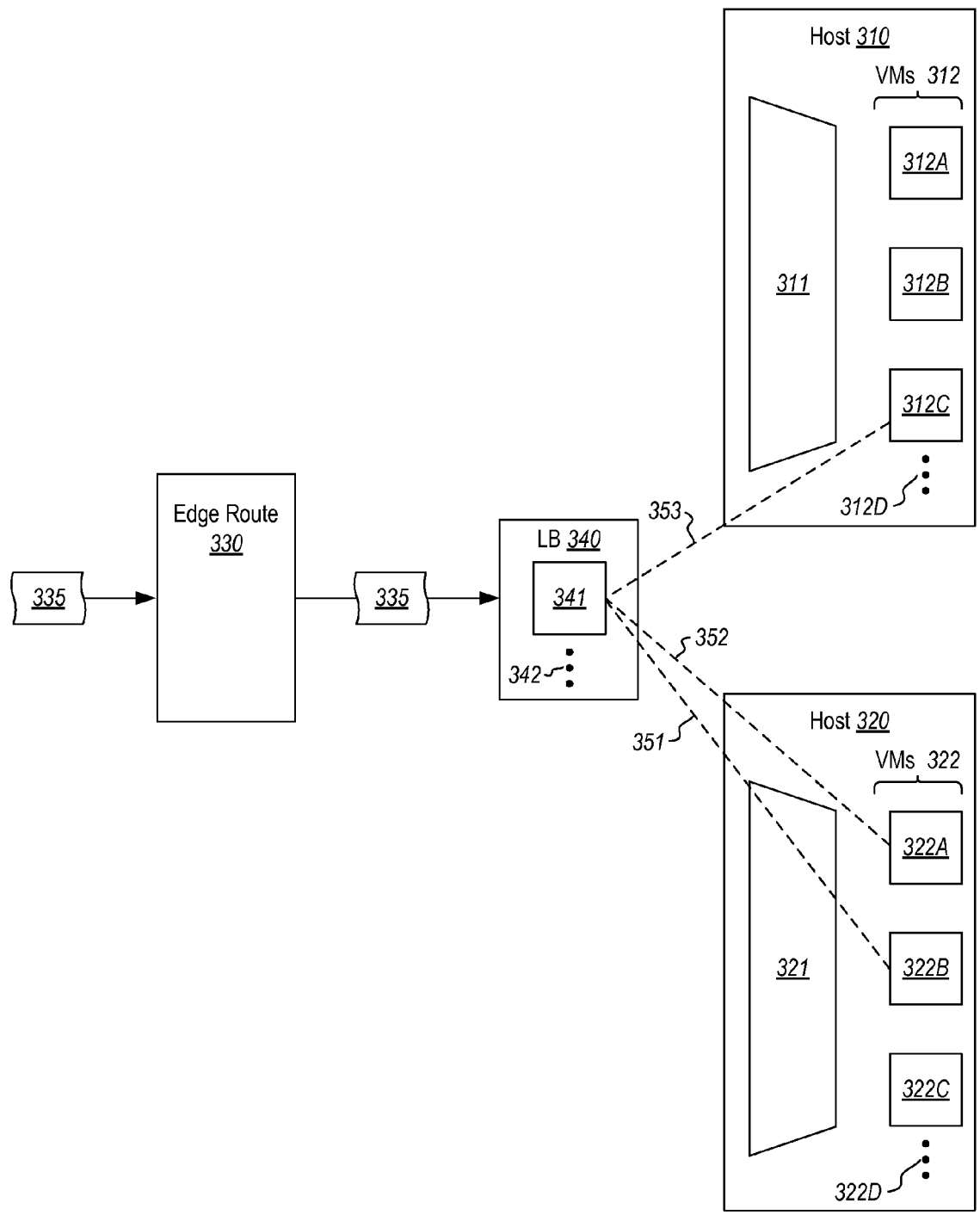
FIG. 3 illustrates a distributed environment in which a load balancer load balances across a virtual network address.

FIG. 3 illustrates a distributed system 300. In the case of FIG. 3, the communicating machines are virtual machines that include hypervisors within host computing systems 310 and 320 (hereinafter referred to simply as "hosts"). Each host 310 and 320 may be structured and operate as described above for the host 200 of FIG. 2. Each host has a hypervisor such as host 200 has hypervisor 220. For instances, hosts 310 and 320 have respective hypervisors 311 and 321.

Alternatively, if the virtual machines were instead physical machines, the hypervisor 311 might be replaced by another intermediary, such as a vmswitch, suitable for physical machines. Likewise, if the virtual machines 322 were instead physical machines, the hypervisor 321 might be replaced by a vmswitch. Furthermore, if the virtual machines 332 were instead physical machines, the hypervisor 331 might also be replaced by a vmswitch.

Each host has virtual machines running thereon much as host 200 has virtual machines 210 running thereon. For instance, host 310 has running thereon virtual machines 312, including virtual machine 312A, 312B and 312C, although the ellipses 312D represent flexibility in the number of virtual machines running on the host 310. Host 320 has running thereon virtual machines 322, including virtual machine 322A, 322B and 322C, although the ellipses 322D represent flexibility in the number of virtual machines running on the host 320.

The distributed system 300 also includes a load balancer 340 that gets network data packets 335 intended for virtual network address 341 from an edge router 330. In some embodiments, the Border Gateway Protocol (BGP) is used for communication between the edge router 330 and load balancer 340, although any suitable protocol may be used. The load balancer 340 is configured such that the network data packages 335 that are received by the load balancer 340 and that are addressed using a virtual network address 341, are distributed to one of a group of virtual machines associated with the virtual network address. For instance, there are three virtual machines associated with the virtual network address 341 including virtual machine 312B (as represented by association 351), virtual machine 312A (as represented by association 352) and virtual machine 322C (as represented by association 353).

The load balancer 340 performs load balancing by selecting one of the virtual machines 312B, 312A or 322C to receive the network data packet addressed to the virtual network, and dispatches the network data packet to that selected virtual machine. The ellipses 342 represents that the load balancer 340 may perform this load balancing function for other virtual network addresses also, which virtual network address may be associated with a distinct set of one or more virtual machines. The virtual network address includes a Virtual Internet Protocol (VIP) address.

Figure 4A:
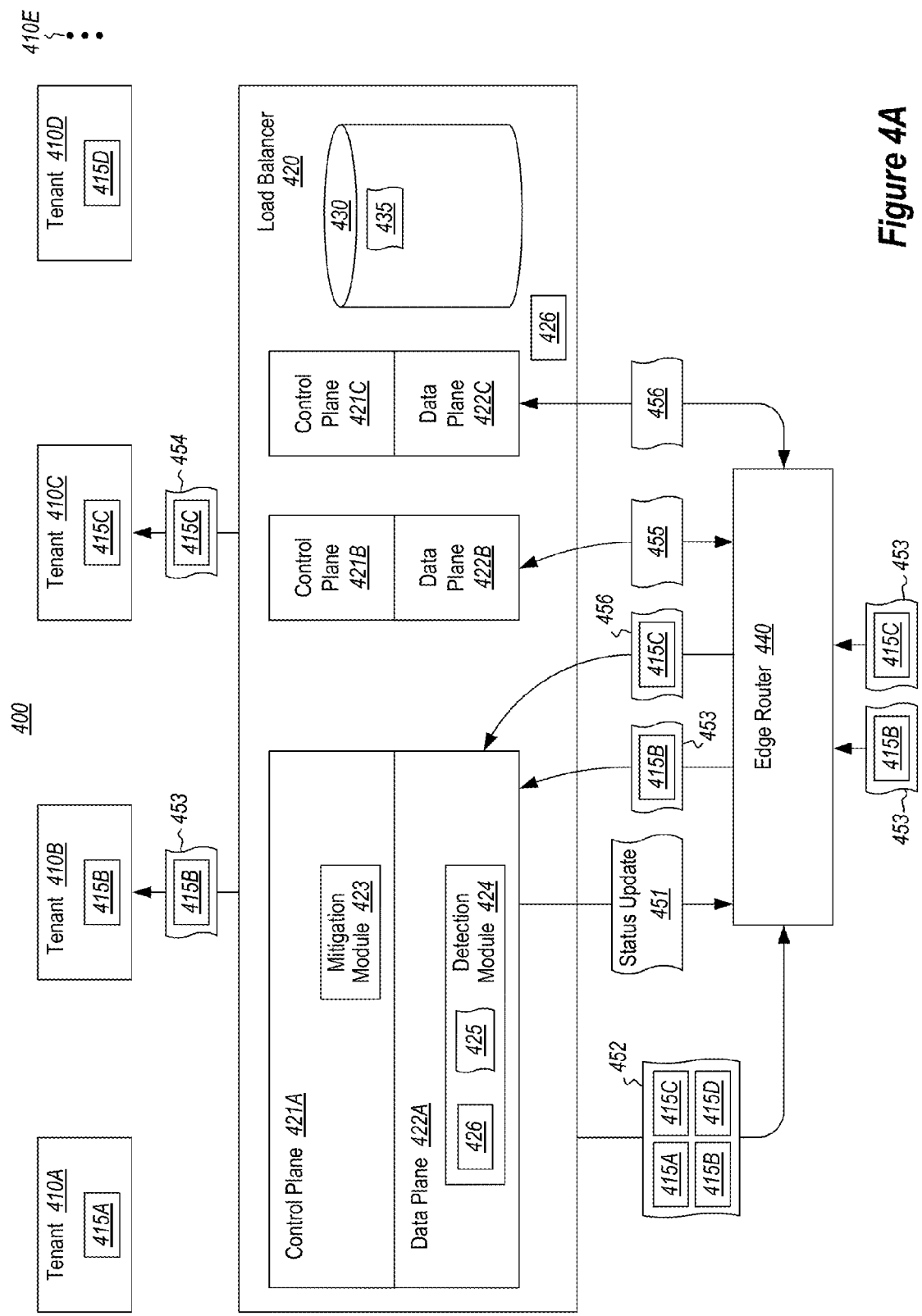
FIGS. 4A-4E illustrate an example environment in which a load balancer is able to detect and then mitigate a Denial of Service (DOS) attack on one or more tenant addresses.

FIG. 4A illustrates a system 400 suitable for detecting and mitigating a Denial of Service (DOS) attack in accordance with embodiments disclosed herein. In FIG. 4A, the system 400 includes tenants 410A, 410B, 410C, 410D (hereinafter also referred to as simply "tenants 410"), although the ellipses 410E represent flexibility in the number of tenants that may be included in system 400. In many embodiments, the system 400 will include numerous tenants 410. The tenants represent a machine or network of machines that are controlled by a single entity and that perform tasks for that entity. In one embodiment, each of the tenants 410 may include one or more virtual machines that are distributed across multiple hosts in the manner previously described in relation to FIGS. 2 and 3. However, in other embodiments the tenants 410 may be single machine. In FIG. 4A, the tenants 410 are shown as a single block entity for ease of illustration.

Each of the tenants 410 is associated with a tenant address that is used to identify the tenant (hereinafter also referred to as simply "tenant addresses 415"). For example, the tenant 410A is associated with a tenant address 415A, the tenant 410B is associated with a tenant address 415B, the tenant 410C is associated with a tenant address 415C, and the tenant 410D is associated with a tenant address 415D. In one embodiment, the tenant address may be or may include a VIP address. In other embodiments, the tenant address may be any other suitable addressing system.

The system 400 includes a load balancer 420, which may correspond to the load balancer 340 previously described. In one embodiment, the load balancer 420 may be implemented in a virtual environment that is distributed across multiple hosts as described in relation to FIGS. 2 and 3. In other embodiments, the load balancer 420 may be implemented in an environment native to one machine. It will be appreciated that the load balancer 420 may be implemented in various ways as circumstances warrant.

In one implementation, the load balancer 420 may include one or more control planes and one or more data planes. Although FIG. 4A shows a one to one relationship between the control planes and the data planes, this is for ease of illustration only. In some implementations of the load balancer 420, there may more or less control planes than data planes. The load balancer 420 may also have access to one or more processors 426, which may be distributed across multiple hosts as described in relation to FIGS. 2 and 3 or which may be native to a single machine.

FIG. 4A shows control planes 421A, 421B, and 421C (hereinafter also referred to as "control planes 421"). It will be appreciated that the load balancer 420 may include more or less than the number of illustrated control planes 421. In the embodiments disclosed herein, the control planes 421 perform various mitigation operations once a DOS attack has been detected. Accordingly, the control planes 421 may include or be associated with a mitigation module 423 that is configured to perform or at least initiate the various mitigation operations as will be explained in more detail to follow. It will be appreciated that the mitigation module 423 represents the computing resources used to perform or at least initiate the various mitigation operations and that these resources may be distributed in the manner previously described. For ease of illustration and explanation, the mitigation module is shown as being directly associated with the control plane 421A, although the other control planes 421 may also access the capabilities of the mitigation module 423.

FIG. 4A shows data planes or MUX 422A, 422B, and 422C (hereinafter also referred to as "data planes 422"). It will be appreciated that the load balancer 420 may include more or less than the number of illustrated data planes 422. In the embodiments disclosed herein, the data planes 422 are placed directly in-line in a data path of network data packets received from an edge router 440 and direct or provide the received network data packets to the intended tenant address 415 as will be explained in more detail to follow. The data planes may include or be associated with a detection module 424 this is configured to detect a DOS attack as will be explained in more detail to follow. It will be appreciated that the detection module 424 represents the computing resources used to detect a DOS attack and that these resources may be distributed in the manner previously described. For ease of illustration and explanation, the detection module 424 is shown as being directly associated with the data plane 422A, although the other data planes 424 may also access the capabilities of the detection module 424.

FIG. 4A shows that load balancer 420 has access to a database base 430, which may be any type of memory accessible by the load balancer 420. The database 420 may include predetermined performance threshold values 435 that correspond to various performance parameters that describe network data packet flow to one or more of the tenant addresses 415. Accordingly, the database 430 may be a repository that holds the performance threshold values 435 in some embodiments. As will be explained in more detail to follow, the performance threshold values 435 are used by the detection module 424 to help determine when the performance parameters reach values that indicate that one or more of the tenant addresses 415 are being subjected to a DOS attack.

FIG. 4A further illustrates network data packet flow and communication between an edge router 440, the load balancer 420, and the tenants 410 as will now be explained. For ease of explanation, the packet flow and communication including the control plane 421A and the data plane or MUX 422A will primarily be discussed. However, it will be appreciated that any discussion for the control plane 421A and the data plane 422A may also apply to the other control planes and data planes of the load balancer 420. Accordingly, elements 455 and 456 represent the various network data packet flow and communication between the edge router 440 and the data planes or MUXes 422B and 422C.

As illustrated, the data plane 422A provides a status or health update 451 to the edge router 440. In normal operation, the data plane 422A provides the status or health update 451 to the edge router about every second, although other time periods are also contemplated. This allows the edge router 440 to ascertain that the data plane 422A is functioning properly. As will be explained in more detail to follow, if the status or health update 451 is not provided to the edge router for a period of time, the edge router will disconnect the current session from the data plane 422A.

The data plane 422A also advertises to the edge router 440 an aggregated range of tenant addresses 452 that the data plane 422A is able to handle. In this way, the edge router 440 provides to the data plane 422A the network data information packets that include the advertised tenant addresses. For example, the advertisement 452 may include a range of tenant addresses that includes tenant addresses 415A-415D as illustrated in FIG. 4A.

The edge router 440, which may be any reasonable edge router or like apparatus, receives network data packets from a network such as the internet (not illustrated) that is addressed or intended for one or more of the tenant addresses 415. Based upon the advertised range of tenant addresses 452, the edge router provides the network data packets for the advertised range of tenant addresses to the data plane 422A. For example, FIG. 4A shows that the edge router 440 provides network data packets 453 that include the tenant address 415B and network data packets 454 that include the tenant address 415C to the data plane 422A since these tenant addresses are included in the advertised range of tenant addresses 452. For ease of illustration, only the network data packets 453 and 454 are illustrated, although it will be appreciated that numerous other network data packets will also be communicated from the edge router 440 to the load balancer 420.

As previously discussed, the data plane 422A includes the detection module 424. In operation, the detection module 424 collects and analyzes various performance parameters 425 for the network data packets addressed to the tenant addresses 415. In one embodiment, the performance parameters 425 may include, but are not limited to, network data packets received per second, network data packets received and discarded, percentage of processor usage, and BGP or other protocol session disconnect from the router 440. It will be appreciated that other performance parameters may also be utilized as circumstances warrant. In some embodiments, these performance parameters are collected every second.

In one embodiment, the detection module 424 implements a sliding window 426 that collects the last ten values of the performance parameters 425 and then stores the maximum value and the average value seen in the sliding window. In other embodiments, alternative collection and measurement methods may also be utilized.

The detection module 424 has access to the performance threshold values 435. Accordingly, the detection module compares the measured performance parameters to the predetermined threshold values 435 to determine if sufficient conditions are present to suggest a DOS attack is occurring. This process will be described in more detail to follow.

Supposing that the detection module 424 does not detect that one of the tenant addresses 415 is being subjected to a DOS attack, the load balancer 420 continues to provide the network data packets to the intended tenant address 415. For example, FIG. 4A shows that the network data packet 453 is provided to the tenant 410B with the tenant address 415B and the network data packet 454 is provided to the tenant 410C with the tenant address 415C. This may accomplished in the manner previously described in relation to FIG. 3 in a distributed virtual environment.

Figure 4B:
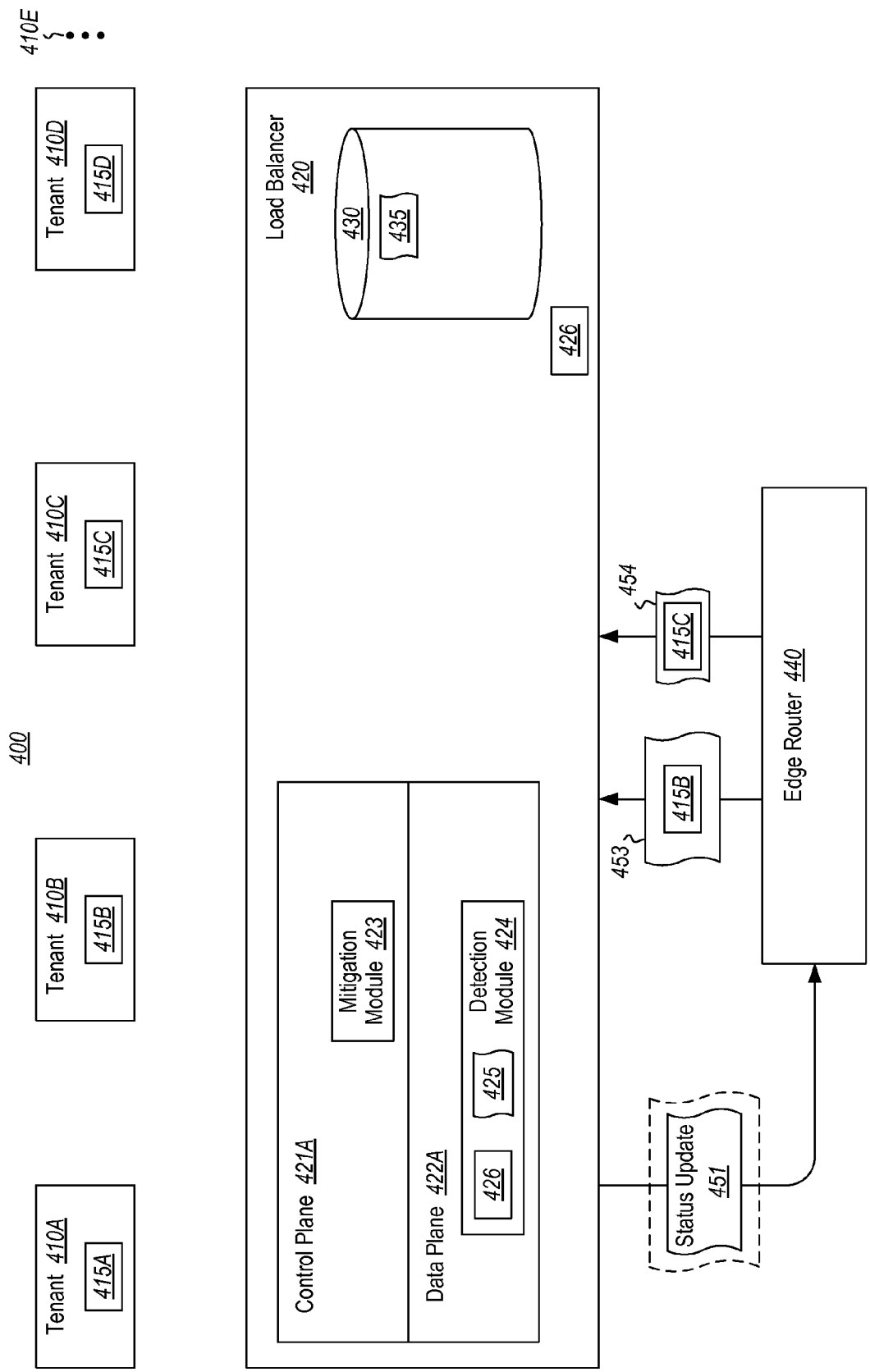

Attention is now given to FIG. 4B, which shows an alternative view of the system 400 and which omits some elements of system 400 for ease of explanation. As shown, the data network packets 453 is larger in FIG. 4B than in FIG. 4A, illustrating that a large number of network data packets have been addressed to tenant address 415B, potentially indicating a DOS attack on the tenant 410B.

When the data network packets 453 are received by the data plane 422A, several events may occur. For example, if the load balancer is running on a physical machine, then a large number of the data packets may be discarded on the network interface card because the system cannot handle such a large number of data packets. In addition, in a distributed virtual environment, there may be a spike in processor (CPU) usage by the system as the data plane tries to process the large number of received packets. Further, a DOS attack may prevent the data plane 422A from providing the regular status or health update 451 to the edge router 440. As illustrated in FIG. 4B, the dashed lines around status or health update 451 indicate that the updates have been interrupted. Without the regular update, the edge router 440 may disconnect the current session with the load balancer 420. In addition, FIG. 4B shows that the load balancer 420 has been overloaded and is not able to provide the network data packets 453 and 454 to the tenants 410B and 410C.

As described above, the detection module 424 analyzes the performance parameters 425 and compares them with the performance threshold values 435 to determine if sufficient conditions are met to indicate that a DOS attack is occurring. In one embodiment the performance threshold values 435 may be the following for the various performance parameters 425: packets received per second >100 k, packets discarded >10% of received packets, CPU usage of at least one core exceeds 80%, and, a BGP session disconnect from a router has occurred. It will be appreciated that other performance threshold values 435 may also be used.

It may often be the case that one of the performance parameters 425 will be above its corresponding performance threshold for a certain period of time for various reasons that are not related to a DOS attack. For example, there may be a spike in processor usage that is caused by something other than a DOS attack or a large number of packets may be discarded for reasons not related to the DOS attack. Accordingly, the detection module 424 may be implemented so that a certain number of performance parameters should be above their corresponding performance thresholds before that detection module determines that sufficient conditions have been met to detect that a DOS attack is occurring. This helps to prevent the detection module 424 from falsely detecting a DOS attack.

If the load balancer 420 of FIG. 4B is running native on a machine, then in one embodiment the following would be sufficient conditions to detect that a DOS attack is occurring: packets received per second >100 k, packets discarded >10% of received packets, and a BGP or other protocol session disconnect from a router has occurred. If the load balancer 420 of FIG. 4B is implemented in the virtual, distributed environment of FIGS. 2-3, then in one embodiment the following would be sufficient conditions to detect that a DOS attack is occurring: packets received per second >100 k CPU usage of at least one core exceeds 80%, and a BGP session disconnect from a router has occurred. Of course, in other embodiments the detection module 425 may be implemented so that more or less than three conditions are sufficient to detect a DOS attack.

The conditions that indicate a DOS attack may not occur at the same time. For example, in an embodiment of a load balancer 420 implemented in the virtual, distributed environment, CPU usage may spike to 90%. However, it may take 30 seconds to receive a BGP or other protocol session disconnect from the edge router 440, during which time the CPU usage may fall to 20%. Accordingly, in some embodiments the detection module 424 may use the sliding window 426 and may store the highest value and the average value seen for each performance parameter during a specified time period. If the sufficient conditions are met during the specified time period, which may be two minutes in some embodiments, then the detection module 424 may detect that a DOS attack is occurring.

Once the detection module 424 has detected that one or more of the tenant addresses 415 are being subjected to a DOS attack, the detection module 424 identifies the specific tenant address 415 that is being attacked. Since the data plane 422A is directly in-line in the data flow path, the detection module 424 is able to ascertain which the network data packets are intended for which tenant address 415. The tenant address 415 who has the most network data packets intended for it will typically be the victim of the DOS attack. In one embodiment, any tenant address 415 that has some predetermined percentage of the network data packets intended for it, for example 70%, will be identified as the subject of the DOS attack, although other percentages may also be used. In the embodiment of FIG. 4B, the detection module 424 will ascertain that the tenant 410B, which includes the tenant address 415C, is being subjected to the DOS attack since the network data packets 453 is above 70% of the received packets.

In some embodiments, a DOS attack will be detected as previously described, but no single tenant address will reach the threshold of having 70% of the network data packets intended for them. This may occur when the DOS attack is a distributed attack that targets more than one tenant 410. If enough of the tenants 410 are subjected to small DOS attacks, the operation of the load balancer 420 may still be disrupted. Accordingly, the detection module 424 may be implemented to determine the two or more tenant addresses 415 who together have the predetermined percentage of the network data packets intended for them are the subjects of the DOS attack.

In some embodiments, the detection module 424 also determines that type of DOS attack. For example, the detection module 424 may determine that the ratio of SYN packets to total packets is very large, for instance 90%. In such cases, the DOS attack is typically a SYN flood attack. If the ratio of SYN packets to total packets is not large, the DOS attack will typically be a UDP flood attack.

The detection module 424 provides the identity of the one or more tenant addresses 415 being subjected to the DOS attack to the mitigation module 423. As previously discussed, the mitigation module 423 is configured to perform various mitigation operations or at least initiate the mitigation operations that isolate the tenant addresses 415 being attacked. Various mitigation operations will now be described.

Figure 4C:
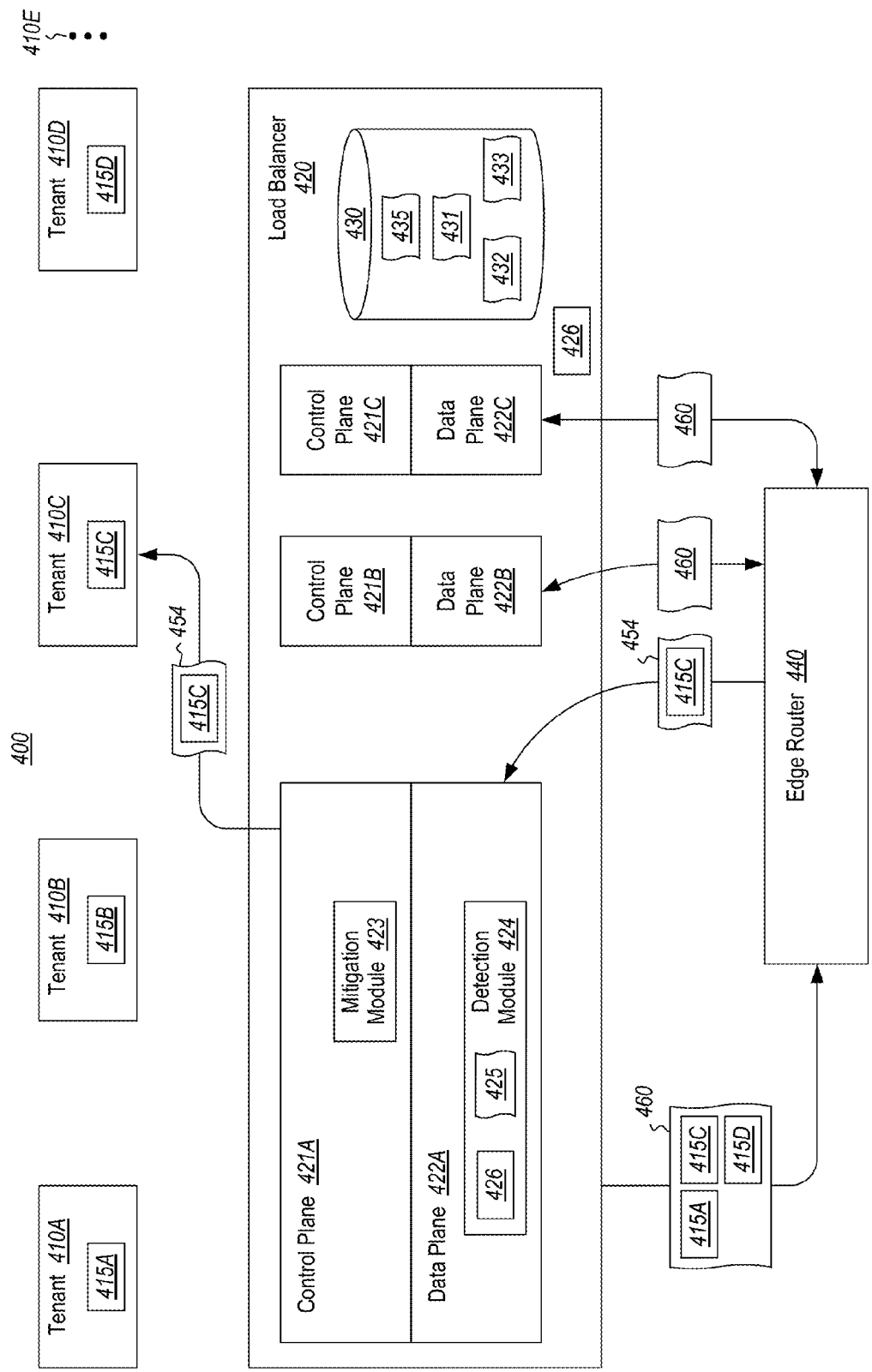

FIG. 4C illustrates an alternative view of the system 400 in which a first mitigation operation referred to herein as "blacklisting" is performed by the mitigation module 423. In the blacklisting operation, the mitigation module first causes the data plane 422A to remove advertising the aggregated range of tenant addresses 452 since this range includes the tenant address 415B to which the network data packets 453 is addressed. This is done to protect the data plane 422A as soon as possible after the DOS attack is detected.

After the aggregated range of tenant addresses 452 is no longer being advertised, the mitigation module 423 removes the one or more tenant addresses 415 being subjected to the DOS attack from the range 452 of advertised tenant addresses. The mitigation module 423 then aggregates the range of tenant addresses that are not being subjected to the DOS attack into a new range. The new range of tenant addresses is then advertised to the edge router 440. For example, FIG. 4C shows that a new aggregated range of tenant addresses 460 is advertised to the edge router 440. The new range of tenant addresses 460 includes tenant address 415A, tenant address 415C, and tenant address 415D. Tenant address 415B is not included as this tenant address is the subject of the DOS attack.

The mitigation module 423 then drives new tenant address routing and advertising across all the data planes of the load balancer 420, as is illustrated in FIG. 4C by the data planes 422B and 422C also providing the range of tenant addresses 460 to the edge router 440. This is done to prevent all the network data packets intended for the tenant addresses from the aggregated range of tenant addresses 452 except for tenant address 415B being provided to data plane 422A. Since the DOS attack may have placed the data plane 422A in an overloaded state, it may not be desirable to have the data plane 422A handle all such network data packets.

The result of blacklisting the tenant address 415B by no longer advertising this tenant address is that the network data packets 453 that were intended for the tenant address 415B are dropped by the edge router 440. Accordingly, the network data packets 453 are no longer received by the tenant 410B. However, the network data packets 454 that are received by the tenant 410C.

In some embodiments, the mitigation module 423 may also store current configuration information 431 for the tenant address 410B in the database 430. The configuration information is then deleted elsewhere so that the tenant address 415B is not longer able to provide outbound network information data to other destinations. Any changes to the configuration information 431 that occur while the tenant address 415B is blacklisted are updated in the database 430. The mitigation module may then inform the data plane 422A that tenant address 415B has been blacklisted and may reset the data plane 422A if the data plane has been in an overloaded state.

The mitigation module 423 also stores a time 432 that the tenant address 415B was blacklisted in the database 430. After waiting a predetermined time 433, the load balancer 420 may perform a "white listing" operation that restores network data packet flow to the tenant address 415B if the DOS attack has ended. The predetermined time 433 may be five minute in one embodiment, although any desired time amount may be used.

The mitigation module 423 restores the configuration information 431 for the tenant address 415B. The mitigation module also adds the tenant address 415B to the range of tenant addresses 460 to thereby recreate the range of tenant addresses 452. As a result, the data plane 422A again advertises to the edge router 440 that the range of tenant addresses includes the tenant address 415B. If the network data packets 453 are still received at the edge router 440, they are provided to the load balancer 420.

As previously described the detection module 424 collects and analyzes the performance parameters 425 for the network data packets received at the data plane 422A. Accordingly, the detection module 424 will detect and identify that that the tenant address 415B is still being subjected to the DOS attack if the attack is still occurring in the manner previously described. If it is determined that the DOS attack has ceased, then the network data packets 453 will continue to be provided to the tenant address 415B as previously discussed.

If it is determined, however, that tenant address 415B is still being subjected to the DOS attack, the mitigation module 423 may again blacklist the tenant address 415B as previously described. After the predetermined time has elapsed, the load balancer 420 may again perform the white listing operation as previously described to determine if the attack is still occurring. This process may be repeated as many times as needed until the DOS attack ceases.

In some embodiments, the subsequent white listing operations may be performed after an increasing longer period of time has elapsed since the last white listing operation to save on system resources. For example, the first white listing operation may occur after a predetermined time of five minutes. However, the second white listing operation may occur after ten minutes while a third white listing operation may occur after twenty minutes. In this way, more time is allowed to pass for the DOS attack to end without having the system perform a white listing operation.

Figure 4D:
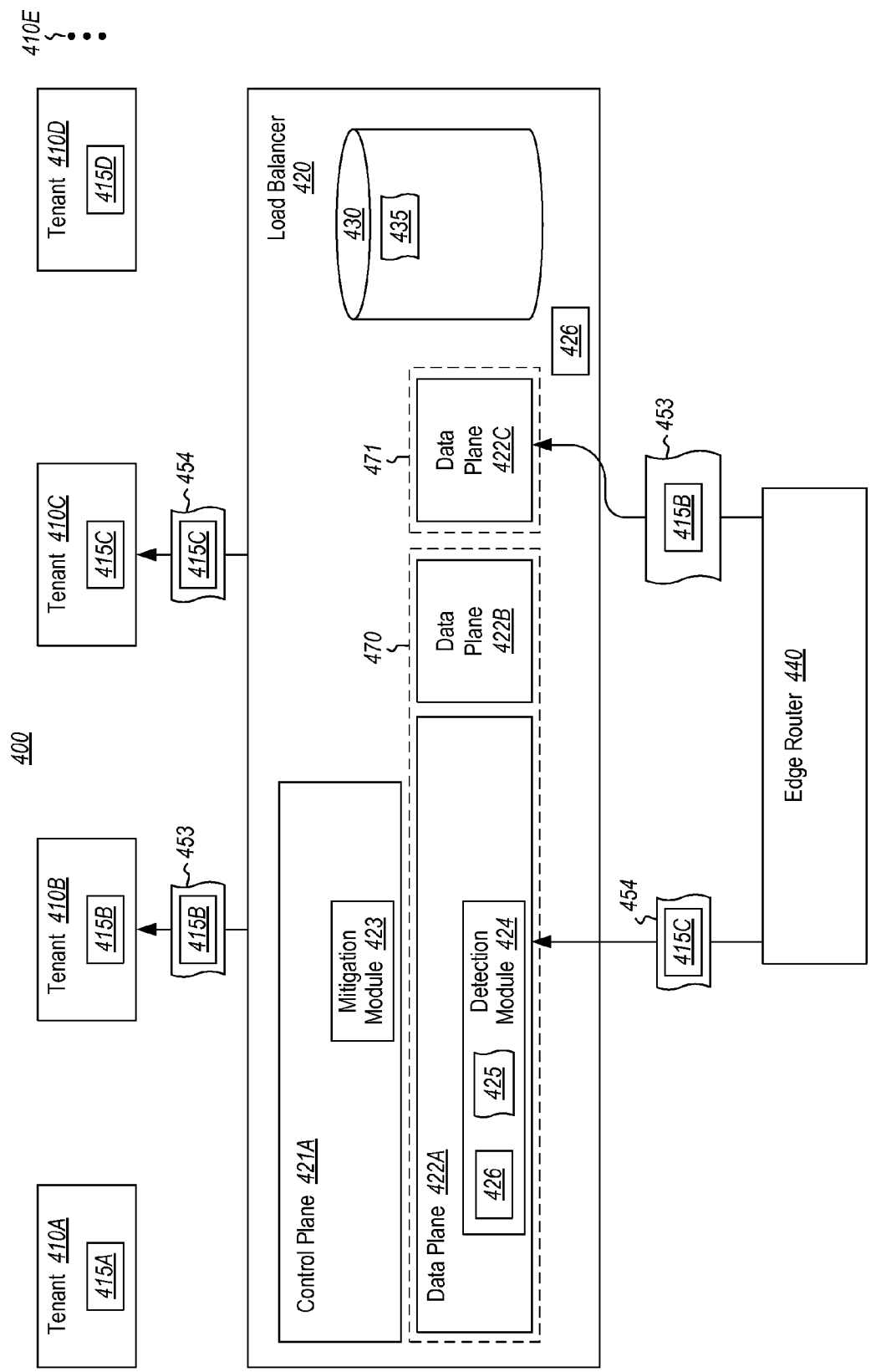

FIG. 4D illustrates an alternative view of the system 400 in which an alternative mitigation operation may be performed. In the system of FIG. 4D, the data planes 422A and 422B are configured as a data plane or MUX pool 470 that has the same configuration for each member of the pool. The data plane 422C is configured a separate data plane or MUX pool 471. The control plane 423A has access to the data plane pools 470 and 471. During normal network data packet flow where a DOS attack is not occurring, the advertised tenant addresses 452 may be serviced by any member of pool 470. However, the control plane 421A may leave the data plane pool 471 as a dedicated data plane for handling tenant addresses that are subjected to a DOS attack.

Accordingly, when tenant address 415B is identified as being subjected to the DOS attack as previously described, the mitigation module 423 causes the network data packets 453 to be handled by the dedicated data plane pool 471. As illustrated in FIG. 4D, the dedicated data plane pool 471 continues to provide the network data packets 453 to the tenant address 415B while the DOS attack is occurring, which may be beneficial to tenant addresses that need to maintain communication. In addition, the other data planes are able to provide the network data packets to the other tenant addresses without being affected by the DOS attack that is occurring against the tenant 422B as illustrated by the data plane 422A continuing to provide the network data packets 454 to the tenant address 415C.

In addition, since the data plane pool 471 is only handling the one or more tenant addresses that are being subjected to the DOS attack, the DOS attack may be analyzed by the data plane 422C so that information about the attack may be obtained. This information may be used by the load balancer 420 to help prevent future attacks. Further, since the data plane pool 471 is only handling the tenant addresses that are being subjected to the DOS attack, the data plane 422B is able to confirm when the DOS attack ends. When the attack ends, the tenant address 415B may be moved back to its original data plane pool 470 so that the data plane 422B is available for further DOS attacks on one or more of the tenant addresses.

Figure 4E:
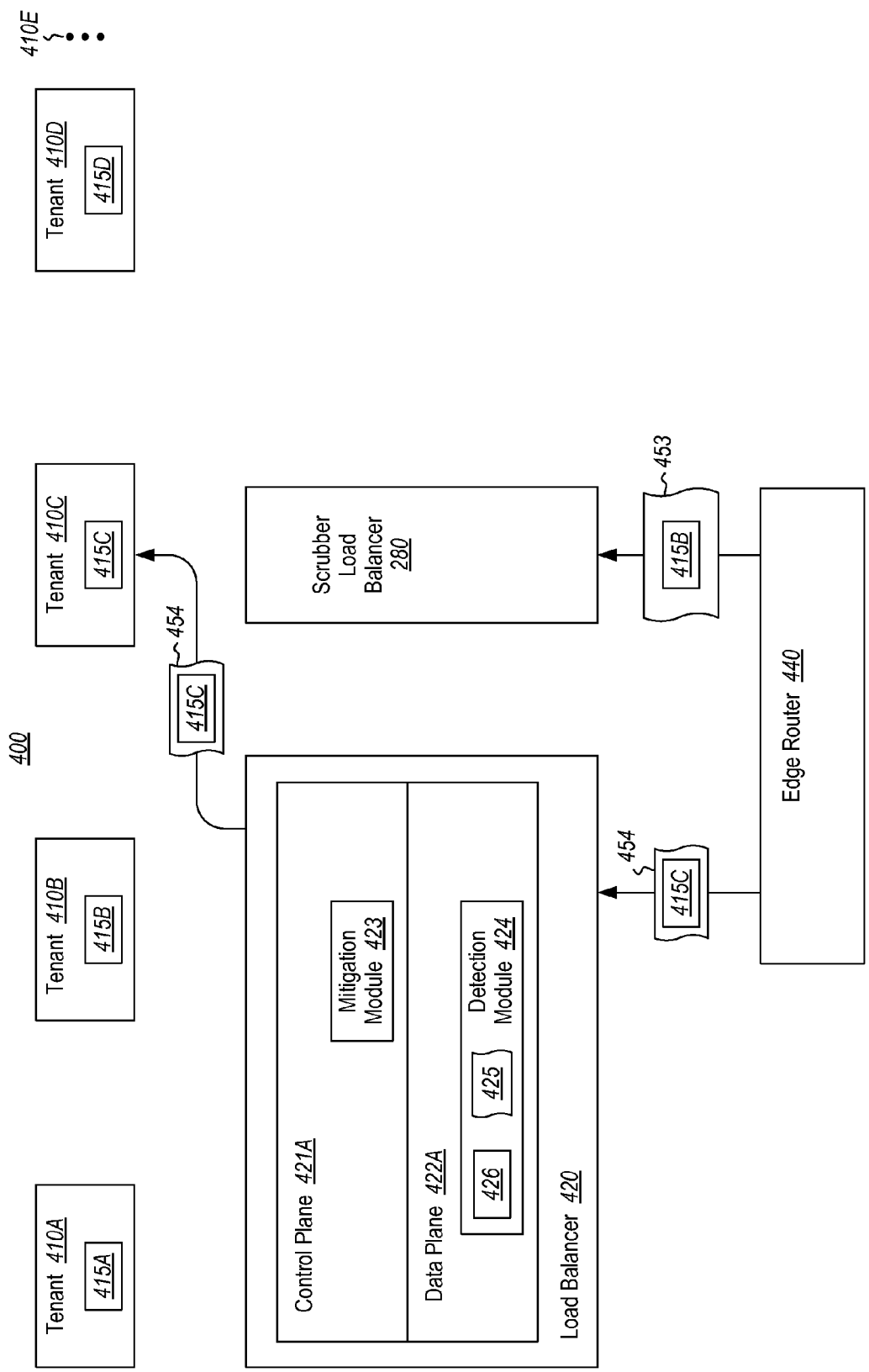

FIG. 4E illustrates an alternative view of the system 400 in which an alternative mitigation operation may be performed. In the system 400 of FIG. 4E, a scrubber load balancer 480 is also part of the system. The scrubber load balancer 480 is configured to analyze DOS attacks. Accordingly, when tenant address 415B is identified as being subjected to the DOS attack as previously described, the mitigation module 423 causes the network data packets 453 to be handled by the scrubber load balancer 480 as illustrated in FIG. 4E. The scrubber load balancer 480 may analyze the network data packets 453 for information about the attacks that may be useful to the system in preventing further attacks. When the scrubber load balancer determines that the DOS attack has ended, the network data packets 453 may be moved back to the load balancer 420.

Figure 5:
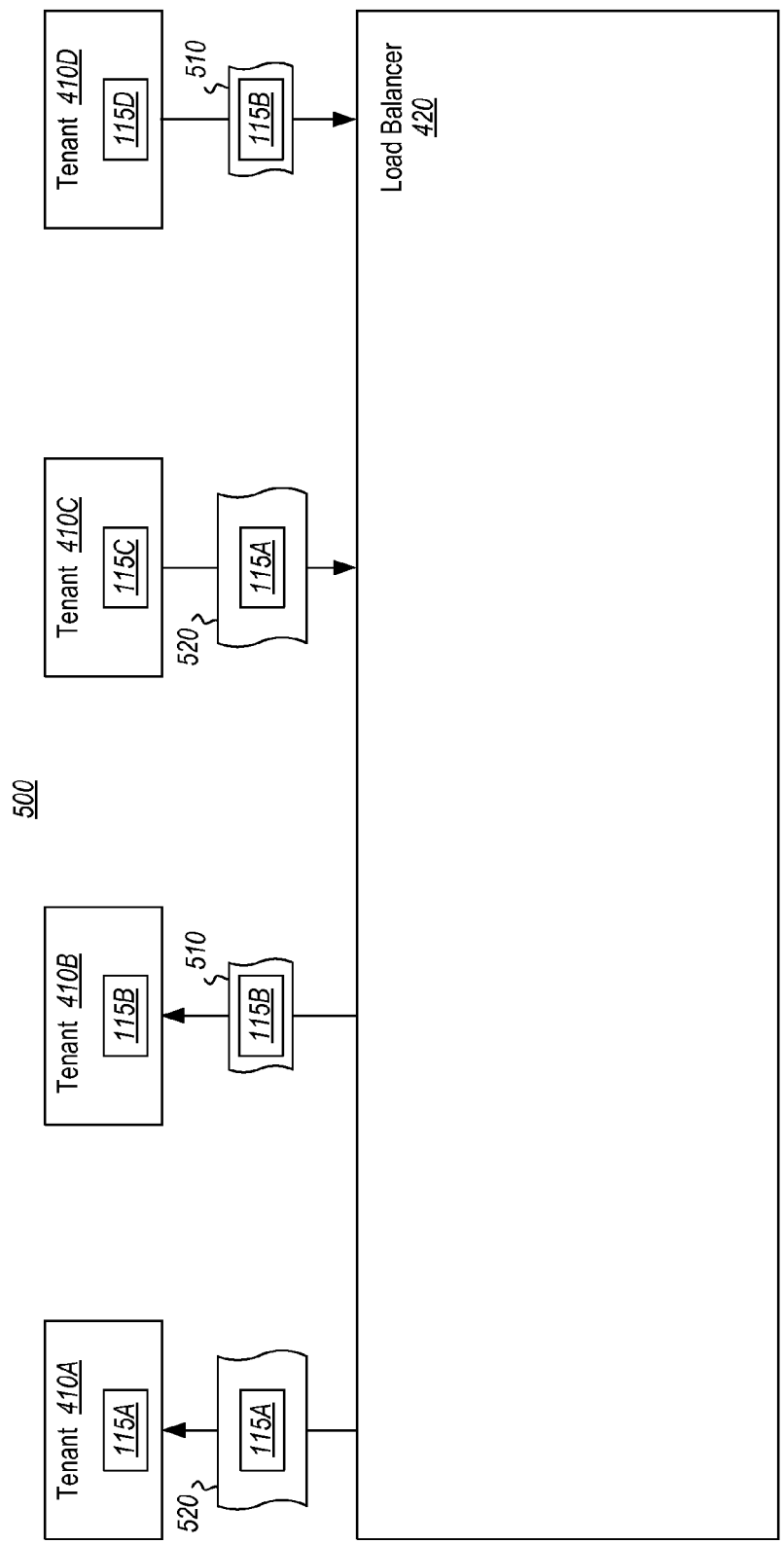
FIG. 5 illustrates an alternative example environment in which a load balancer is able to detect and then mitigate a Denial of Service (DOS) attack on one or more tenant addresses.

In the embodiments previously described, the network data packets were provided to the load balancer 420 by the edge router 440. However, as illustrated in FIG. 5, in some embodiments the tenants 110 may be the initiator of network data packets that are addressed to other tenants. This allows for inter-tenant communication without having to use an external network via the edge router 440. For example, the tenant 110D may provide network data packets 510 that are addressed to tenant address 115B and the tenant 110C may provide network data packets 520 that are addressed to the tenant address 115A. The load balancer 420 may provide the network data packets 510 to the tenant address 115B and the network data packets 520 to the tenant address 115A as previously described.

Because the tenants 110 may initiate the network data packet flow, the tenants may also subject one or more of the tenant addresses 115 to a DOS attack. As illustrated in FIG. 5, the large size of the network data packets 520 indicate that the tenant 110C is subjecting the tenant address 115A to a DOS attack.

Advantageously, the load balancer 420 according to the embodiments disclosed herein sits in-line in the flow of data packets between the tenants. This allows the load balancer 420 to detect a DOS attack like the one shown in FIG. 5 and then mitigate the attack as previously described. Conventional DOS attack detection systems are typically implemented at the edge router and detect the DOS attack by sampling the network data packets received at the edge router. Such conventional detection systems would not be able to detect a DOS attack like the one shown in FIG. 5 since the edge router would not ever see the network data packets that are causing the DOS attack. Accordingly, the load balancer of the embodiments disclosed herein is able to detect and mitigate DOS attacks in a distributed, virtual environment implemented in a cloud, which is an advantageous step over conventional systems.

The following discussion now refers to a number of methods and method acts that may be performed. Although the method acts may be discussed in a certain order or illustrated in a flow chart as occurring in a particular order, no particular ordering is required unless specifically stated, or required because an act is dependent on another act being completed prior to the act being performed.

Figure 6:
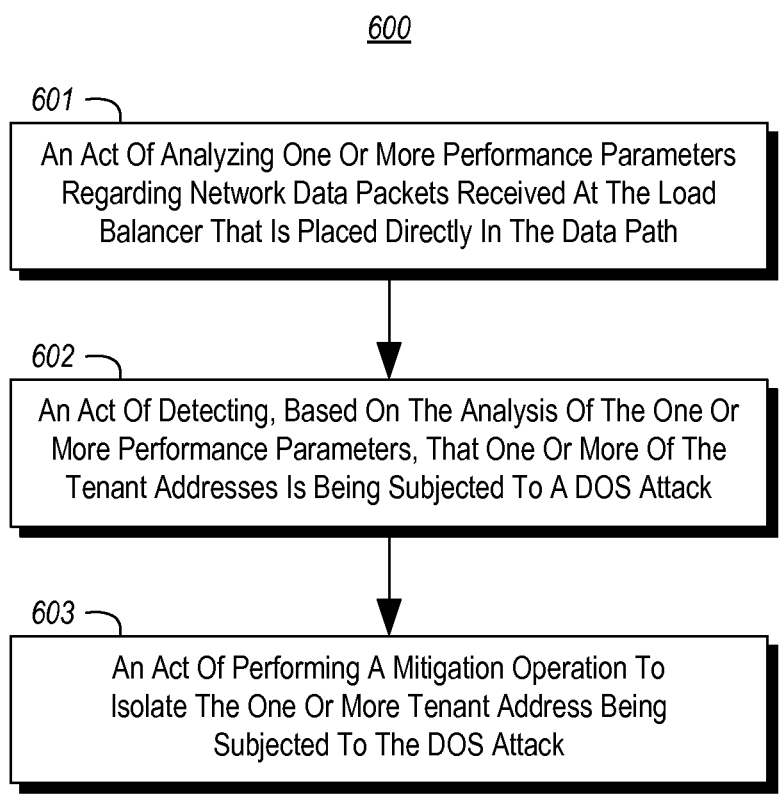
FIG. 6 illustrates a flowchart of an example method for a load balancer to detect and mitigate a DOS attack on one or more tenant addresses.

FIG. 6 illustrates a flow chart of an example method 600 for a load balancer that is placed in-line in a network data packet flow path between a source and one or more tenant addresses to detect and mitigate a DOS attack. The method 600 will be described with the respect to the system 400 described above.

The method 600 includes an act of analyzing one or more performance parameters regarding network data packets received at the load balancer that is placed directly in the data path (act 601). The network data packets are directed to or destined for one or more tenant addresses. The one or more performance parameters describe network data packet flow to the one or more tenant addresses. For example, the network data packets 453 and 454 that are intended for the tenant addresses 415B and 415C, which may be virtual IP addresses, may be received by the load balancer 420. The detection module 424 may collect and analyze one or more performance parameters 425 that indicated information about the network data packets 453 and 454.

The method 600 includes an act of detecting, based on the analysis of the one or more performance parameters, that one or more of the tenant addresses is being subjected to a DOS attack (act 602). For example, the detection module may compare the analyzed performance parameters 425 with performance thresholds 435 to ascertain if sufficient conditions have been satisfied that indicate that a tenant address is being subjected to the DOS attack. Once the sufficient conditions have been satisfied, the detection module 425 may identify the one or more tenant addresses, for example tenant address 415B in the described embodiments, that are being attacked based on the percentage of network traffic to those tenant addresses as previously described.

The method 600 includes an act of performing a mitigation operation to isolate the one or more tenant addresses being subjected to the DOS attack (act 603). For example, the mitigation module 423 may perform or at least initiate various mitigation operations that isolate the attacked tenant addresses. In one embodiment, the mitigation module may perform a blacklisting operation that removes the tenant address being subjected to the DOS attack from a range of advertised tenant addresses. This will cause the network data packets intended for the tenant addresses being attacked to be dropped at the edge router. After a predetermined time, the blacklisted tenant addresses may be white listed as previously described.

In another embodiment, the mitigation module 423 may move the tenant addresses being subjected to the DOS attack to a dedicated data plane or MUX, for example data plane 422C, so that network packets may continue to be sent to the attacked tenant addresses without impacting the flow to data to the other tenant addresses as previously described.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method for a load balancer to detect and mitigate a Denial of Service (DOS) attack directed at one or more tenant addresses, the load balancer being placed in a data path of network data packets being transmitted between one or more sources and the one or more tenant addresses, the method comprising:

an act of analyzing one or more performance parameters regarding network data packets received at the load balancer that is placed in the data path, the network data packets being structured so as to be directed to one or more tenant addresses, the one or more performance parameters describing network data packet flow to the one or more tenant addresses;

an act of periodically providing an advertised listing of tenant addresses to an edge router or other source of the network data packets, the listing of tenant addresses being used to route the network data packets to the load balancer;

an act of detecting, based on the analysis of the one or more performance parameters, that one or more of the tenant addresses is being subjected to a DOS attack; and an act of performing a mitigation operation to isolate the one or more tenant address being subjected to the DOS attack, the mitigation option including an act of omitting the one or more tenant addresses from the advertised listing of tenant addresses for at least a predetermined period of time or until it is determined that the at least one tenant address is no longer subject to the DOS attack.

2. The method in accordance with claim 1, wherein the act of performing the mitigation operation comprises:

an act of determining a range of tenant addresses to which the one or more tenant addresses that are being subjected to the DOS attack belong;

an act of causing the load balancer to no longer advertise that the range of tenant addresses is available to receive the network data packets;

an act of removing the one or more tenant addresses that are being subjected to the DOS attack from the range of tenant addresses;

an act of aggregating the range of the tenant addresses not including the one or more tenant addresses that have been removed from the range of tenant addresses into a second range of tenant addresses; and an act of advertising across one or more data planes of the load balancer that the second range of tenant addresses is available to receive the network data packets.

3. The method in accordance with claim 2, further comprising:

an act of storing a current configuration of the one or more tenant addresses that have been removed from the range of tenant addresses in a persistent store; and an act of at least temporarily preventing the one or more tenant addresses that have been removed from the range of tenant addresses from being able to send network data packets.

4. The method in accordance with claim 2, further comprising:

an act of waiting a specified amount of time;

an act of adding the one or more tenant addresses that have been removed from the range of tenant addresses to the second range of tenant addresses; and an act of determining if the one or more tenant addresses added to the second range of tenant addresses is still be subjected to the DOS attack, wherein if it is determined that at least one of the one or more tenant addresses is still being subjected to the DOS attack, the at least one of the one or more tenant addresses is removed from the second range of tenant addresses.

5. The method in accordance with claim 1, wherein the one or more tenant addresses is a virtual IP address that is load balanced across a plurality of destinations.

6. The system in accordance with claim 1, wherein the act of performing the mitigation operation comprises:

the tenant address move and returning the one or more tenant addresses to the first data plane when it is determined that the one or more tenant addresses are no longer under attack.

7. The method in accordance with claim 1, wherein the act of performing a mitigation operation further comprises:

an act of moving the one or more tenant addresses that are being subjected to the DOS attack to a second load balancer that is configured to analyze the DOS attack so as to learn information about the DOS attack, and an act of returning the one or more tenant addresses to the original load balancer when it is determined that the one or more tenant addresses are no longer under attack.

8. The method in accordance with claim 1, wherein the act of detecting comprises:

an act of comparing the one or more performance parameters with a predetermined threshold; and detecting that the one or more tenant addresses are being subjected to the DOS attack when the one or more performance parameters exceed the predetermined threshold.

9. The method in accordance with claim 1, wherein the one or more performance parameters include one or more of:

packets received per second;

packets received and discarded;

CPU usage; and protocol session disconnect from an edge router.

10. The method in accordance in accordance with claim 1, wherein the DOS attack is initiated by one of the tenant addresses on another of the tenant addresses.

11. A computer program product comprising one or more computer-readable hardware storage device having stored thereon computer-executable instructions that are structured such that, when executed by one or more processors associated with a load balancer that is placed in a data path of network data packets being transmitted between one or more source addresses and a one or more tenant addresses, cause the load balancer to detect and mitigate a Denial of Service (DOS) attack directed at one or more of the tenant addresses, the method comprising:

an act of collecting one or more performance parameters regarding network data packets received at the load balancer that is placed in the data path, the network data packets being structured so as to be directed to one or more tenant addresses, the one or more performance parameters describing network data packet flow to the one or more tenant addresses;

an act of comparing the collected performance parameters with performance thresholds;

an act of detecting, based on the comparison of the one or more performance parameters with the performance thresholds, that at least one of the one or more of the tenant addresses is being subjected to a DOS attack in a first data plane of the load balancer that is configured to receive network packets;

an act of identifying the at least one tenant address that is being subjected to the DOS attack in the first data plane; and an act of performing a mitigation operation to isolate the at least one tenant address being subjected to the DOS attack, by at least moving the at least one tenant address subjected to the DOS attack from the first data plane to a second data plane of the load balancer that is capable of handling the network data packets for the at least one tenant address, so that the at least one tenant address subjected to the DOS attack will continue to receive the network data packets while being under attack; and an act of returning the at least one tenant address to the first data plane when it is determined that the at least one tenant address is no longer under attack.

12. The system of claim 11, wherein the act of performing the mitigation operation comprises said omitting the address of the at least one tenant address subjected to the DOS attack by performing at least performing the following:
    an act of determining a range of tenant addresses to which the at least one tenant address belongs;
    an act of causing the load balancer to no longer advertise that the range of tenant addresses is available to receive the network data packets;
    an act of removing the at least one tenant address from the range of tenant addresses;
    an act of aggregating the range of the tenant addresses not including the at least one tenant address into a second range of tenant addresses; and
    an act of advertising across one or more data planes of the load balancer that the second range of tenant addresses is available to receive the network data packets.

13. The computer program product in accordance with claim 12, further comprising:
    an act of storing a current configuration of the at least one tenant address in a persistent store; and
    an act of at least temporarily preventing the at least one tenant address from being able to send any network data packets.

14. The computer program product in accordance with claim 12, further comprising:
    an act of waiting a specified amount of time;
    an act of adding the at least one tenant address to the second range of tenant addresses; and
    an act of determining if the at least one tenant address is still be subjected to the DOS attack, wherein if it is determined that the at least one tenant address is still being subjected to the DOS attack, then removing the at least one tenant address from the second range of tenant addresses.

15. The computer program product in accordance with claim 11, wherein the act of collecting one or more performance parameters comprises:
    implementing a sliding window that collects a predefined number of the performance parameters; and
    storing a maximum value and average value of the performance parameters collected in the sliding window.

16. The computer program product in accordance with claim 11, wherein the DOS attack is initiated by one of the tenant addresses on another of the tenant addresses.

17. A system, the system comprising:
    one or more tenants each having a tenant address that identifies the tenant as an intended recipient of network data packets sent from one or more sources;
    a performance threshold repository that holds performance threshold values that are indicative of a Denial of Service (DOS) attack;
    one or more processors;
    an edge router configured to receive one or more network data packets destined for one or more of the tenant addresses; and
    a load balancer that is configured to receive the one or more network data packets from the edge router and to distribute the one or more network data packets to the tenant address, the load balancer being in the data flow path of the one or more network data packets, the load balancer configured to detect and mitigate a DOS attack on at least one tenant address of the one or more of the tenant addresses, the load balancer comprising:
        a detection module configured to perform the following:
            collect one or more performance parameters regarding network data packets received at the load balancer, the network data packets being destined for one or more tenant addresses, the one or more performance parameters describing network data packet flow to the one or more tenant addresses;
            compare the collected performance parameters with the performance thresholds values;
            detect, based on the comparison of the one or more performance parameters with the performance threshold values, that one or more of the tenant addresses is being subjected to a DOS attack;
            identifying the at least one tenant address that is being subjected to the DOS attack; and
        a mitigation module configured to perform the following:
        perform a mitigation operation to isolate the one or more tenant address being subjected to the DOS attack, by performing at least one of:
            a tenant address move from a first data plane to a second data plane of the load balancer that is capable of handling the network data packets for the at least one tenant address, so that the at least one tenant address subjected to the DOS attack will continue to receive the network data packets while being under attack and returning the at least one tenant address to the first data plane when it is determined that the at least one tenant address is no longer under attack, or
            an act of periodically providing a listing of tenant addresses to an edge router or other source of the network packets and filtering the listing of tenant addresses after detecting the DOS attack, by omitting the address of the at least one tenant address subjected to the DOS attack from the listing of tenant addresses for a predetermined period of time.

18. The system according to claim 17, wherein the one or more tenant addresses is a virtual IP address that is load balanced across a plurality of destinations.

* * * * *